UNITED STATES PATENT OFFICE.

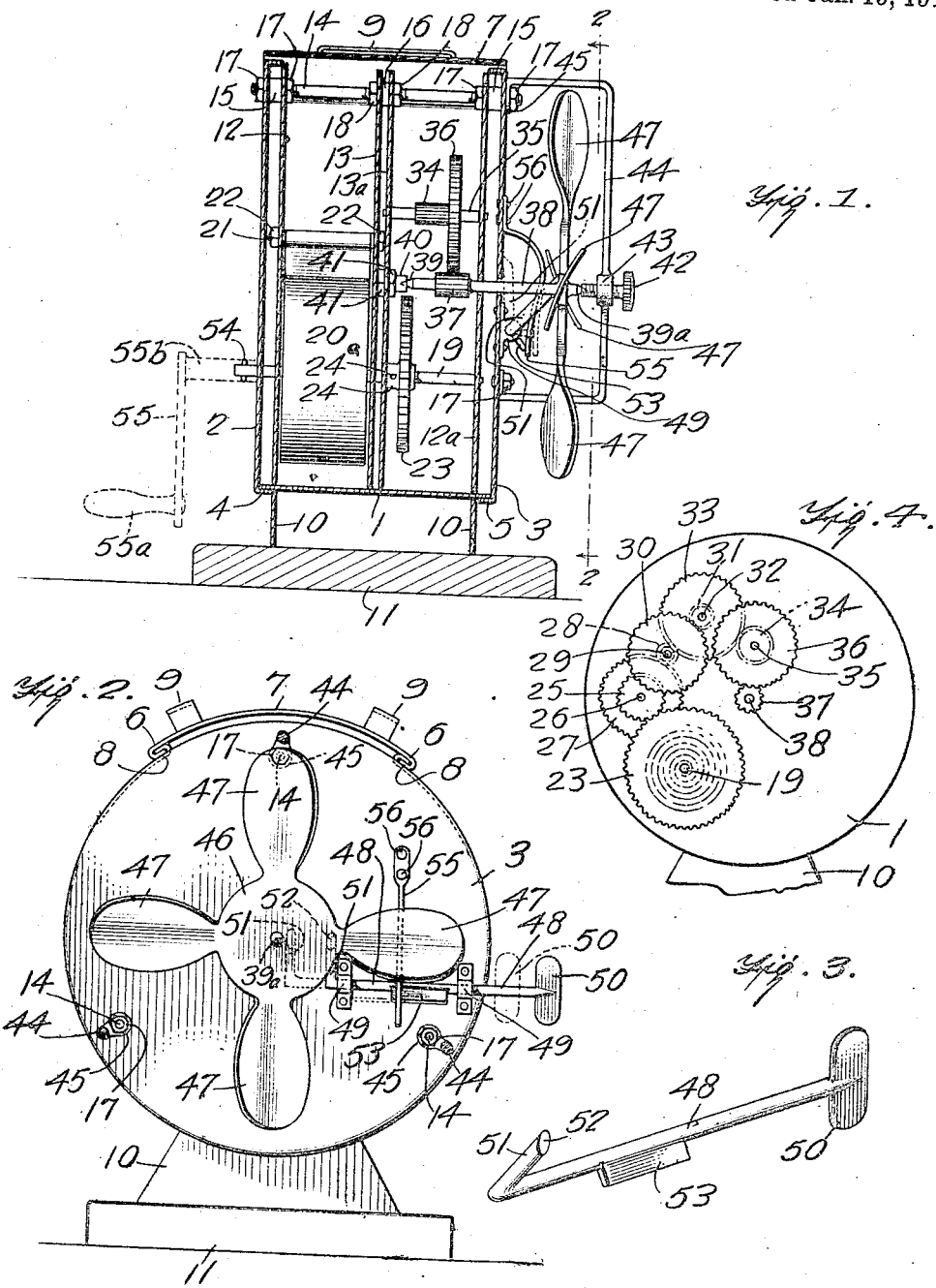

JOSEPH CARTLAND McGEE, OF GRENADA, MISSISSIPPI.

MACHINE-BRAKE.

1,125,860.  Specification of Letters Patent.  Patented Jan. 19, 1915.

Application filed April 6, 1914. Serial No. 829,867.

*To all whom it may concern:*

Be it known that I, JOSEPH C. McGEE, a citizen of the United States, and a resident of Grenada, in the county of Grenada and State of Mississippi, have invented a new and useful Improvement in Machine-Brakes, of which the following is a specification.

My invention is an improvement in machine brakes, and has for its object to provide a brake, especially adapted for use with fans for cooling buildings or for producing currents of air wherever desired, and especially fans driven by spring motors, wherein the brake is arranged to engage the fan directly, for holding the fan against movement during the winding of the motor, or at any other time, the said mechanism being releasable.

In the drawings:—Figure 1 is a longitudinal vertical section of the improved fan, Fig. 2 is a front view, Fig. 3 is a perspective view of the key, and Fig. 4 is a rear view of the gear train.

The present embodiment of the invention comprises a casing consisting of an arc-shaped body 1, and heads 2 and 3. Each of the heads 2 and 3 is provided with a marginal lateral flange 4 and 5 respectively, and the flanges are lapped outside of the body. The ends of the body are bent outwardly and backwardly as shown at 6, to form flanges overlying the body, and a door 7 of arc-shape is arranged between the ends of the body. Each end of the door is provided with an inwardly and backwardly bent flange 8, overlying the door in spaced relation, and the flanges 8 engage beneath the flanges 6 to hold the door in place. The door is also provided with a pair of handles 9, one of the handles being near each end of the door and transversely thereof.

The casing is supported by plates 10, each of which is secured to a base 11, of wood or like material. Each of the plates 10 as shown more particularly in Fig. 1, is of greatest width at its lowest end, and the said end rests upon the upper face of the base. The upper end of each of the plates is concave to fit the body of the casing, and the plates engage the casing just inside of the flanges 4 and 5 of the heads.

A series of disks, four in the present instance, is arranged within the casing, one of the disks 12 being near the head 2, another of the disks $12^a$ being near the head 3, and the other disks 13 and $13^a$ being arranged alongside each other in spaced relation at the center of the casing. The four disks are connected to each other in spaced relation and to the heads 2 and 3, also in spaced relation, by means of three rods 14. Each rod is threaded at its ends and intermediate its ends and passes through registering openings in the disks and heads. Arbors 15 are arranged on each rod between the disks 12—$12^a$ and the heads 2 and 3, and another arbor 16 is arranged on each rod between the disks 13 and $13^a$. The arbors 15 space the disks 12 and $12^a$ from the heads 2 and 3, and a nut 17 is threaded on to each rod adjacent to each disk 12 and $12^a$, and each head 2 and 3. The nuts 17 clamp the disks and the heads against the opposite ends of the arbors 15, and other nuts 18 are threaded on to each rod adjacent to each disk 13 and $13^a$. The disks 12—$12^a$, 13—$13^a$ support the motor mechanism for the fan. The said mechanism comprises a spring shaft 19, journaled transversely of the four disks, and extended beyond the head 2. A coil spring 20 of suitable width and thickness is wound on the shaft between the disks 12 and 13, one end of the spring being secured to the disk and the other end being secured to a rod 21, supported by the disks 12 and 13, parallel to the shaft 19. The ends of the rod are threaded and are engaged by nuts 22 at the outer faces of the disks 12 and 13 respectively. A gear wheel 23 is secured to the shaft 19, between the disks $12^a$ and $13^a$, the said gear wheel having a hub 24, which is fitted on the shaft and pinned thereto as indicated at $24^a$. The gear wheel meshes with a pinion 25, on a shaft 26, journaled between the disks $12^a$ and $13^a$, and the shaft 26 is provided with a gear wheel 27, which meshes with a pinion 28 on a shaft 29, journaled parallel with the shafts 19 and 26 between the disks $12^a$ and $13^a$.

A gear wheel 30 is secured to the shafts 29, and the gear wheel meshes with a pinion 31 on a shaft 32. The shaft is provided with a gear wheel 33, which meshes with a pinion 34 on another shaft 35, and a gear wheel 36 on the shaft 35 meshes with the pinion 37 on the fan shaft 38. The shafts 26, 29, 32 and 35 are all journaled in parallel relation with respect to each other and to the shaft 19, and between the disks 12ª and 13ª.

It will be evident that when the shaft 19 is rotated under the influence of the spring 20 the train of gears constituted by the pinions 25, 28, 31 and 34 and the gear wheels 27, 30, 33 and 36 will drive the fan shaft 38 at a higher rate of speed, the said train of gears being a speeding up train provided for such purpose.

The shaft 38 which carries the fan is pointed at each end as shown at 39 and 39ª. The point 39 of the shaft is seated in a step bearing 40, which is secured to the disk 13ª, by means of lock nuts 41, arranged on opposite faces of the disk. The shaft passes through openings in the disk 12ª and in the head 3, and the point 39ª is engaged by the inner end of a set screw 42, which is threaded through a nut 43, held in alinement with the shaft 38, by means of angular bracket arms 44.

The arms 44 are integral with the nut at one end, and extend from the nut radially at angular intervals of 120°. Near the periphery of the casing the arms are bent toward the casing, and the inner end of each arm is provided with a laterally extending perforated lug 45, which engages the adjacent rod 14, and the adjacent nut 17 is arranged outside of the lug to clamp the lug to the outer face of the head 13.

The fan comprises a central disk hub 46, rigidly secured to the fan shaft near the pointed end 39ª, and four wings or vanes 47 extending from the disk hub in spaced relation, and the said wings or vanes are inclined spirally with respect to the shaft. The shaft 48 shown in Fig. 3 is journaled in bearings 49 on the outer face of the head 3, and the said shaft is provided at one end with a transversely extending finger piece 50, and at the other end with an angular portion 51, the said portion extending at right angles to the shaft, and being inclined with respect to the finger piece 50.

The free end of the lug 51 is beveled as shown at 52, and the shaft is provided with a radial wing or vane 53, intermediate its ends, and between the bearings 49. The bracket arms 44 in addition to their function of supporting the nut or bearing 43 act also as a guard for the fan to prevent injury to the fan or to prevent injury to persons from the fan. That portion of the shaft 19 which extends beyond the head 2 is provided with a transverse pin 54, for engaging a transverse slot in the barrel of a key, indicated in dotted lines at 55 in Fig. 1. By means of the key, the shaft 19 may be rotated in a direction to wind up the spring.

The cover plate 7 permits access to the driving mechanism of the fan for purposes of cleaning or oiling, or repairing. The plate may be moved longitudinally of the shaft 19 to release the flanges 8 from the flanges 6. A resilient rod 55 is secured to the head 3 near the periphery thereof, by means of rivets 56, or the like, and that portion of the rod connected to the head is offset inwardly from the body of the rod. The lower end of the rod is bent inwardly as shown in Fig. 1, and is in position for engagement by the wing or vane 53 on the shaft 48.

The rod normally holds the shaft in the full line position of Fig. 1, that is, with the beveled surface 52 of the lug 51 in engagement with the rear face of the disk hub 46. The shaft 48 is movable longitudinally in its bearing, as indicated in dotted lines in Fig. 2, and when the shaft is moved inwardly to its fullest extent, the beveled end 52 of the lug will engage the disk hub near the shaft 19. When the shaft 48 is moved outwardly, it may be moved far enough to disengage the vane 53 from the rod 55, so that the rod no longer affects the shaft.

The shaft is a brake for the fan, preventing movement of the fan when in the dotted line position of Fig. 2. When the shaft is in the full line position of Fig. 2, it has no action upon the fan, since it may take the dotted line position of Fig. 1 with the lug 51 out of contact with the fan.

The operation of the device is as follows:—When it is desired to wind the motor, the shaft 48 is moved into the dotted line position of Fig. 2, which is the full line position of Fig. 1. The fan is now prevented from movement, and the spring 20 may be wound by means of the key 55. After the spring has been wound, and it is desired to start the fan, the shaft 48 is moved into the full line position of Fig. 2, which is the dotted line position of Fig. 1. The fan is now free to move and it will be driven until the spring runs down. The fan shaft being supported in the manner shown, may be easily adjusted to run smoothly and freely and with a minimum amount of friction.

I claim:—

In a device of the character specified, a motor, and releasable means for preventing movement of the motor, said means comprising a shaft having an angular lug for engaging a moving part of the motor frictionally to hold the same from movement, said shaft being mounted to oscillate and to move longitudinally, and having a finger piece at its outer end for permitting the shaft to be moved, and resilient means in connection with the shaft for forcing the lug into contact with the moving part of the motor, said means comprising a radial vane extending longitudinally of the shaft, a resilient rod fixed at one end and engaging the vane at the other, and normally pressing the shaft in a direction to cause the lug to engage the motor, said vane being releasable from the rod when the shaft is moved longitudinally in the proper direction.

JOSEPH CARTLAND McGEE.

Witnesses:
J. L. BARNARD,
O. L. KIMBROUGH.